United States Patent [19]
Iwatani et al.

[11] Patent Number: 5,886,500
[45] Date of Patent: Mar. 23, 1999

[54] VEHICLE GENERATOR CONTROLLER

[75] Inventors: Shiro Iwatani; Keiichi Komurasaki; Hirofumi Watanabe, all of Tokyo, Japan

[73] Assignee: Mitsubishi Denki Kabushiki Kaisha, Tokyo, Japan

[21] Appl. No.: 980,328

[22] Filed: Nov. 26, 1997

[30] Foreign Application Priority Data

May 26, 1997 [JP] Japan .................................. 9-135196

[51] Int. Cl.$^6$ ........................................................ H02J 7/14
[52] U.S. Cl. ................................................ 320/104; 322/28
[58] Field of Search .................................... 320/104, 123, 320/137, 103, DIG. 10, DIG. 34, 148, 156, 160, 161, 162; 322/28, 14, 22, 44

[56] References Cited

U.S. PATENT DOCUMENTS

| | | |
|---|---|---|
| 4,680,529 | 7/1987 | Komurasaki et al. . |
| 4,839,576 | 6/1989 | Kaneyuki et al. . |
| 5,140,253 | 8/1992 | Itoh . |
| 5,144,220 | 9/1992 | Iwatani et al. ............................ 322/28 |
| 5,157,321 | 10/1992 | Kato et al. ................................ 322/28 |
| 5,225,764 | 7/1993 | Falater ...................................... 322/28 |
| 5,231,344 | 7/1993 | Marumoto et al. ....................... 322/14 |
| 5,243,270 | 9/1993 | Mayumi et al. ...................... 322/99 X |

FOREIGN PATENT DOCUMENTS

| | | |
|---|---|---|
| 0201243 | 4/1986 | European Pat. Off. . |
| 0339576 | 4/1989 | European Pat. Off. . |
| 0430203 | 11/1990 | European Pat. Off. . |
| 0430208 | 11/1990 | European Pat. Off. . |
| 0438884 | 12/1990 | European Pat. Off. . |
| 0545616 | 11/1992 | European Pat. Off. . |
| 4306489 | 12/1993 | European Pat. Off. . |
| 0751602 | 1/1997 | European Pat. Off. . |
| 64-34900 | 3/1989 | Japan . |

*Primary Examiner*—Edward H. Tso
*Attorney, Agent, or Firm*—Sughrue, Mion, Zinn, Macpeak & Seas, PLLC

[57] ABSTRACT

A vehicle generator controller comprises a voltage detection circuit for outputting a voltage detection signal D to regulate a generated voltage VG in accordance with a battery voltage VB, a gradual increase control circuit for outputting a gradual increase control signal E in response to the voltage detection signal D and a switching element for intermittently controlling a field voltage in response to the gradual increase control signal E, the gradual increase control circuit includes a smoothing circuit for smoothing the voltage detection signal D by a charging time constant and a discharging time constant and a comparator for outputting the gradual increase control signal E by comparing the smoothing signal with a triangle voltage, both the charging time constant and the discharging time constant of the smoothing circuit are set to one second or more and the gradual increase control signal E moves to a waveform for gradually decreasing the field voltage when the battery voltage increases. With this arrangement, the vehicle generator controller suppresses a torque shock when an electric load is turned on as well as suppresses the drop of a battery voltage when the electric load is repeatedly turned on.

3 Claims, 4 Drawing Sheets

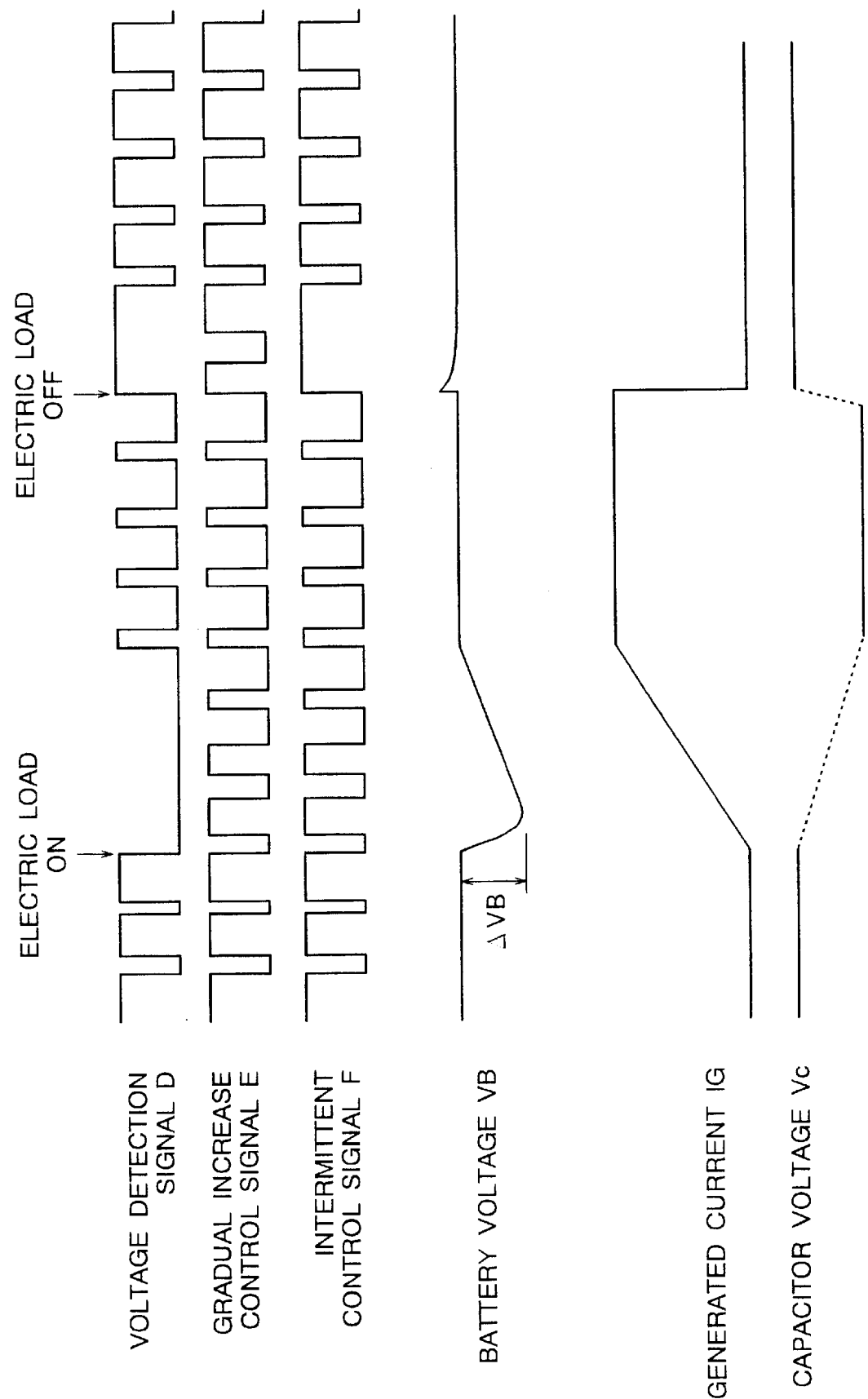

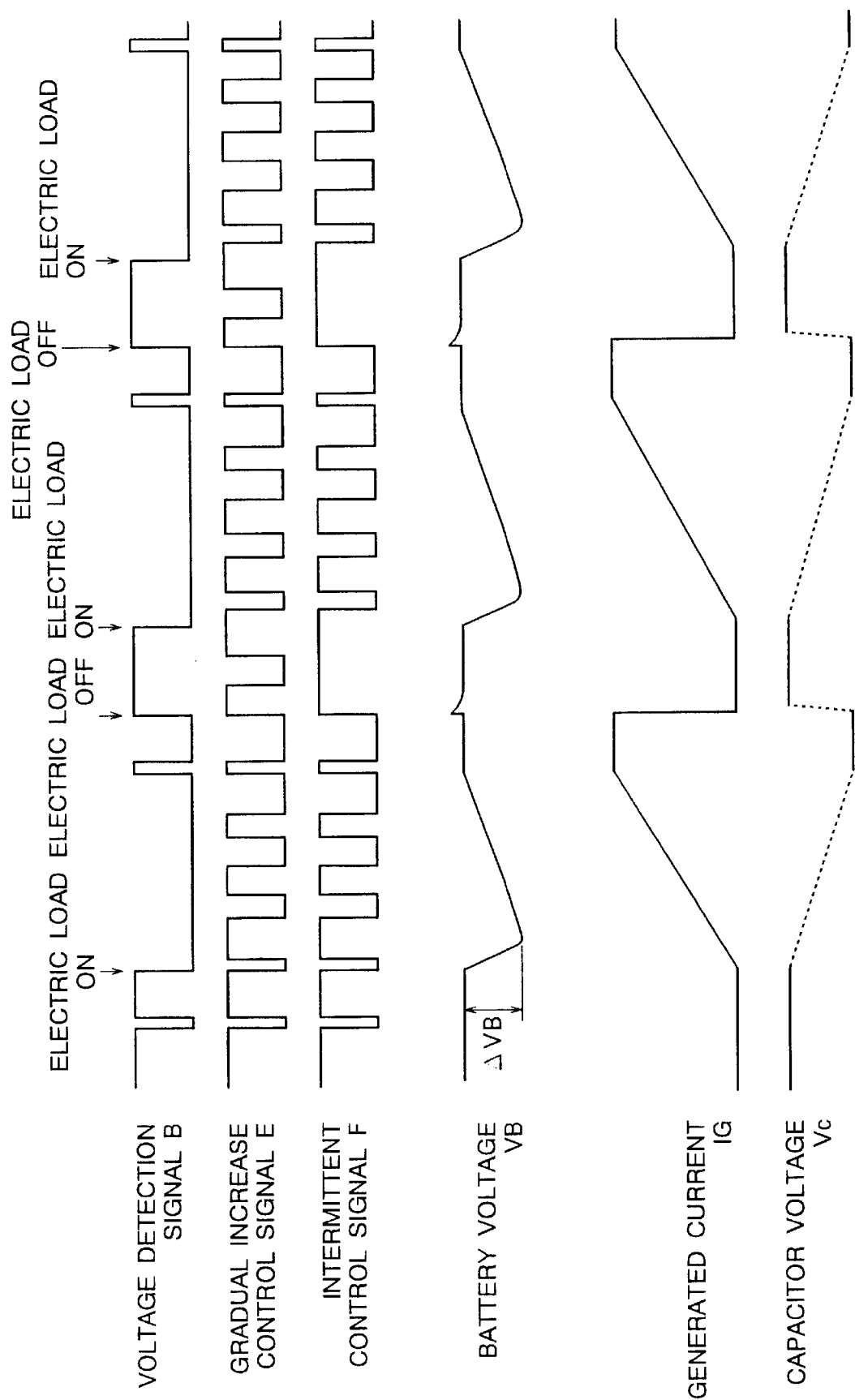

ed in series to the output terminal of the comparator 405 in inverted polarity, a charging resistor 513 inserted

VEHICLE GENERATOR CONTROLLER

BACKGROUND OF THE INVENTION

1. Field of the Invention

The present invention relates to a vehicle generator controller for gradually increasing the current generated by a generator by gradually increasing a field current by intermittently operating a switching element when a battery voltage is dropped by the turn-on of an electric load, and more specifically, to a vehicle generator controller by which the cyclic drop of the battery voltage is suppressed when the electric load is repeatedly turned on and off.

2. Description of the Related Art

Conventionally, in a vehicle generator controller, since a torque shock is caused when a generated current is increased in instant response to the drop of a battery voltage, the current generated by a generator is gradually increased by gradually increasing a field current by the gradual increase of a conducting ratio (duty) executed by the intermittent operation of a switching element.

FIG. 2 is a circuit diagram showing a conventional vehicle generator controller disclosed in, for example, Japanese Unexamined Utility Model Publication No. 64-34900.

In the drawing, a generator 1 driven by an internal combustion engine (not shown) includes an armature coil 101 and a field coil 102 and is mounted on a vehicle.

The rectifier 2 of the generator 1 for subjecting the ac output from the generator 1 to full wave rectification includes an output terminal 201 acting as the main output terminal of a generated voltage VG, an output terminal 202 for exciting the field coil 102 and an output terminal 203 for the ground.

A controller for controlling the field current IF (generated current IG) of the generator 1 is composed of a voltage regulator 4 for regulating the output voltage VG (battery voltage VB) from the generator 1 to a predetermined value, a smoothing circuit 5 for smoothing the voltage detecting signal D of the battery voltage, a comparison circuit 7 operating in response to the output signal level from the smoothing circuit 5 and a constant voltage power supply circuit 8 for creating a constant power source A.

The smoothing circuit 5 and the comparison circuit 7 constitute a gradual increase control circuit for gradually increasing the field current IF of the generator 1 when the battery voltage VB drops.

A battery 9 mounted on the vehicle is charged by the output created by the generator 1 through the rectifier 2. A key switch 10 is connected to an end of the battery 9. The electric load 11 of the vehicle such as head lights, an air conditioner and the like is connected between both the ends of the battery 9. A switch 12 for imposing the electric load 11 is inserted between an end of the electric load 11 and one of the ends the battery 9.

The voltage regulator 4 includes resistors 401, 402 for creating a detected voltage Vb by dividing the voltage VB of the battery 9, resistors 403, 404 for creating a reference voltage VR by dividing the constant power source A, a comparator 405 for outputting a voltage detection signal D by comparing the detected voltage Vb with the reference voltage VR, an emitter-grounded transistor 407 inserted to the field coil 102 in series therewith for intermittently controlling the field current IF, a diode 408 for absorbing the surge caused by the intermittent operation of the transistor 407 and a resistor 409 inserted between the base of the transistor 407 and the output terminal 202.

The voltage regulator 4 includes an emitter-grounded transistor 410 having a collector connected to the base of the transistor 407, a pair of diodes 411, 412 inserted in series between the output terminal of the comparator 405 and the base of the transistor 410 in inverted polarity and a resistor 413 inserted between the constant power source A and the point where diode 411 is connected to the diode 412.

The smoothing circuit 5 includes a pair of diodes 511, 512 connected in series to the output terminal of the comparator 405 in inverted polarity, a charging resistor 513 inserted between the constant power source A and the point where the diode 511 is connected to the diode 512, a capacitor 503 inserted between the cathode of the diode 512 and the ground and a discharging resistor 515 connected in parallel with the capacitor 503.

The comparison circuit 7 includes a comparator 702 for outputting a gradual increase control signal E by comparing a triangle voltage VT created from a triangle generator 701 with the capacitor voltage VC from the capacitor 503, an emitter-grounded transistor 712 inserted between the base of the transistor 407 and the ground and a resistor 713 inserted between the point where the base of the transistor 712 is connected to the output terminal of the comparator 702 and the constant power source A.

With this arrangement, the comparison circuit 7 creates an intermittent control signal based on the gradual increase control signal E to thereby create an intermittent control signal F to the field coil 102 by the intermittent operation of the transistor 407, so that the comparison circuit 7 gradually increases the field current IF and the current generated by the generator 1.

The gradual increase control signal E which is output from the comparator 702 gradually increases the conducting duty of the transistor 407 in response to the voltage which is output from the smoothing circuit 5, that is, to the capacitor voltage VC to thereby gradually increase the field current IF.

A series circuit composed of a diode 111 and an initially exciting resistor 112 is inserted between the key switch 10 and an end of the field coil 102.

The constant voltage power supply circuit 8 is composed of a series circuit inserted between the key switch 10 and the ground and including a pull-up resistor 801 and a Zener diode 802.

With this arrangement, when the key switch 10 is turned on, the constant power source A is created from the point where the pull-up resistor 801 is connected to the Zener diode 802 based on the battery voltage VB.

Next, operation of the conventional vehicle generator controller shown in FIG. 2 will be described with reference to the waveform views of FIG. 3 and FIG. 4.

FIG. 3 and FIG. 4 show the change in time of respective signals D–F and respective voltages VB and VC as well as the current which is output from the generator, that is, the current IG generated therefrom which corresponds to the turning on and off of the electric load 11, wherein FIG. 3 is an operation waveform view when the head lights, defoggers and the like which are usually in an on-state are turned on and FIG. 4 is an operation waveform view when a hazard indicator, a winker and the like which are intermittently imposed are turned on.

In this case, since the charging resistor 513 in the smoothing circuit 5 has a relatively small resistance value and the discharging resistor 515 therein has a relatively large resistance value, a charging time constant is set to a short time of about 100 milliseconds and a discharging time constant is set long of about a few seconds.

Further, it is assumed that the voltage detection signal D from the comparator 405 and the gradual increase control signal E from the comparator 702 exhibit an approximately equivalent operation waveform in the usual state that the electric load 11 is not turned on.

First, when the key switch 10 is turned on, the battery voltage VB of the battery 9 is imposed on the Zener diode 802 through the resistor 801 and the constant power source A which is clamped by the Zener diode 802 is created from the point where the resistor 801 is connected to the Zener diode 802.

With this operation, although the controller of the generator 1 is made to an operable state, since the generator 1 does not yet start power generation, the signal level on the non-inverting input terminal (+) side of the comparator 405 in the voltage regulator 4 is lower than the reference voltage VR on the inverting terminal (−) thereof and accordingly the comparator 405 outputs the voltage detection signal D of a level.

At the time, since the capacitor 503 in the smoothing circuit 5 is not charged, the capacitor voltage VC has a zero potential. Therefore, the signal level on the non-inverting input terminal (+) side of the comparator 702 in the comparison circuit 7 is lower than the triangle voltage VT and the gradual increase control signal E is fixed to a low level and the transistor 712 remains in an off-state.

Consequently, the transistor 407 is turned on and the field current IF flows to the field coil 102 to thereby put the generator 1 to a power generation possible state.

When the internal combustion engine starts operation and the generator 1 starts power generation by being driven by the internal combustion engine, the signal level on the non-inverting input terminal (+) side of the comparator 405 in the voltage regulator 4 is increased by the increase of the battery voltage VB. When the signal level on the non-inverting input terminal (+) side becomes higher than the reference voltage VR, the voltage detection signal D is switched from the low level to a high level and the transistor 407 is switched from a conducting state to a shut-off state.

As described above, the voltage regulator 4 detects the battery voltage VB at all times and when, for example, it detects the drop of the battery voltage VB, it increases the conducting ratio of the transistor 407 through the comparator 702.

Since the field current IF is increased by the increase of the conducting ratio of the transistor 407 and the battery 9 is charged by the increase of the output from the generator 1, the battery voltage VB is controlled to a constant rated voltage.

When, for example, the switch 12 is turned on and the electric load 11 is turned on, the comparator 702 is operated and the field current IF is increased by the drop of the battery voltage VB.

At the time, although the comparator 405 which responds to the battery voltage VB creates the voltage detection signal D of a low level by increasing the conducting duty of the field current IF, since the discharging time constant of the smoothing circuit 5 is set longer than the charging time constant thereof, the comparator 702 in the comparison circuit 7 increases the conducting ratio of the transistor 407 so as to gradually increase the duty.

Therefore, as the conducting ratio of the transistor 407 increases, the field current IF gradually increases so that the output from the generator 1 gradually increases while suppressing a response shock.

When, for example, the usually-turned-on electric load 11 (head lights, defoggers and the like) is turned on, the voltage detection signal D intends to increase the conducting duty by becoming to the low level when the electric load 11 is turned on as shown in FIG. 3. However, since the capacitor voltage VC is dropped by the long time constant and the duty of the low level section of the gradual increase control signal E is gradually increased, the generated current IG is gradually increased while being suppressed without reaching a value corresponding to the response at once.

At the time, the battery voltage VB temporarily drops by a drop amount VB when the electric load 11 is turned on.

Further, when the electric load 11 is turned off because the switch 12 is shut off, since the voltage detection signal D of the high level which is output from the comparator 405 is imposed on the transistor 407, the intermittent control signal F is made to an operation waveform equivalent to the voltage detection signal D which relatively promptly returns to the waveform before the electric load 11 is turned on.

At the time, since the charging time constant determined by the resistor 513 and the capacitor 503 in the smoothing circuit 5 is short and the capacitor voltage VC is promptly charged as shown in the drawing, the gradual increase control signal E from the comparator. 702 also relatively promptly returns to the waveform (waveform in the low level section having a small duty) before the electric load 11 is turned on.

Likewise, when the electric load 11 (hazard indicator, winker and the like) which is intermittently imposed is turned on, the battery voltage VB also temporarily drops by the drop amount VB when the electric load 11 is turned on as shown in FIG. 4.

Thereafter, when the electric load 11 is turned off in the cyclic turning on and off thereof, the gradual increase control signal E which is output from the comparator 702 returns to the waveform before the electric load 11 is turned on.

At the time, since the gradual increase control signal E promptly returns to the waveform before the electric load 11 is turned on as described above when the electric load 11 is turned off, the battery voltage VB also temporarily drops by the drop amount VB when the electric load is turned on next time likewise the time when it was turned on for the first time.

Therefore, since the battery voltage VB cyclically drops each time the electric load 11 is repeatedly turned on in the case of FIG. 4, the head lights which have been turned on lower their quantity of light cyclically, by which the driver is made uncomfortable.

As described above, although the conventional vehicle generator controller gradually increases the field current (generated current) by the gradual increase control circuit composed of the smoothing circuit 5 and the comparison circuit 7 so as to suppress the torque shock when the electric load 11 is turned on, since the charging time constant is set short, the capacitor 503 is the smoothing circuit 5 is charged in a short time when the electric load 11 is turned off. Thus, there is a problem that when, in particular, the electric load 11 is repeatedly turned on and off, the battery voltage VB greatly drops each time the electric load 11 is turned on, by which the driver is made uncomfortable.

An object of the present invention made to solve the above problem is to provide a vehicle generator controller for suppressing a torque shock which is caused in response to the turn-on of an electric load as well as suppressing the drop of a battery voltage when the electric load is repeatedly turned on.

SUMMARY OF THE INVENTION

A vehicle generator controller according to the present invention for regulating a voltage output from a generator for charging a battery mounted on a vehicle in accordance with a battery voltage comprises a voltage detection circuit for outputting a voltage detection signal by comparing the battery voltage with a reference voltage; a gradual increase control circuit for outputting a gradual increase control signal in response to the voltage detection signal; and a switching element for intermittently controlling the field current of the generator in response to the gradual increase control signal; wherein the gradual increase control circuit includes a smoothing circuit for smoothing the voltage detection signal; a triangle generator for creating a triangle voltage; and a comparator for outputting a gradual increase control signal by comparing the signal output from the smoothing circuit with the triangle voltage; wherein the smoothing circuit includes a time constant circuit for setting a charging time constant and a discharging time constant to the voltage detection signal; wherein the charging time constant and the discharging time constant are set such that the comparator gradually increases the field current by intermittently operating the switching element when the battery voltage drops; the conducting ratio of the switching element is gradually increased in response to the gradual increase control signal when the battery voltage drops as well as instantly decreased regardless of the gradual increase control signal when the battery voltage increases; and both the charging time constant and the discharging time constant of the smoothing circuit are set to one second or longer to permit the gradual increase control signal to gradually decrease when the battery voltage increases as well as to gradually increase from a level in the midway of the gradual decrease when the battery voltage drops in the midway of the decrease as well as to permit the conducting ratio of the switching element to gradually increase from the conducting ratio which is in response to the gradual increase control signal in the midway of the gradual decrease when the battery voltage drops.

The time constant circuit of the vehicle generator controller according to the present invention is composed of a CR circuit including resistors and a capacitor.

Further, the time constant circuit of the vehicle generator controller according to the present invention is composed of a constant current circuit and a capacitor.

BRIEF DESCRIPTION OF THE DRAWINGS

FIG. 3 is a waveform view explaining operation of the conventional vehicle generator controller when an electric load which is continuously imposed is turned on; and FIG. 4 is a waveform view explaining operation of the conventional vehicle generator controller when an electric load which is intermittently imposed is tuned on and off.

DESCRIPTION OF THE PREFERRED EMBODIMENTS

Embodiment 1

Operation of an embodiment 1 of the present invention will be described with reference to FIG. 2 together with the waveform view of FIG. 1.

Figure 2:
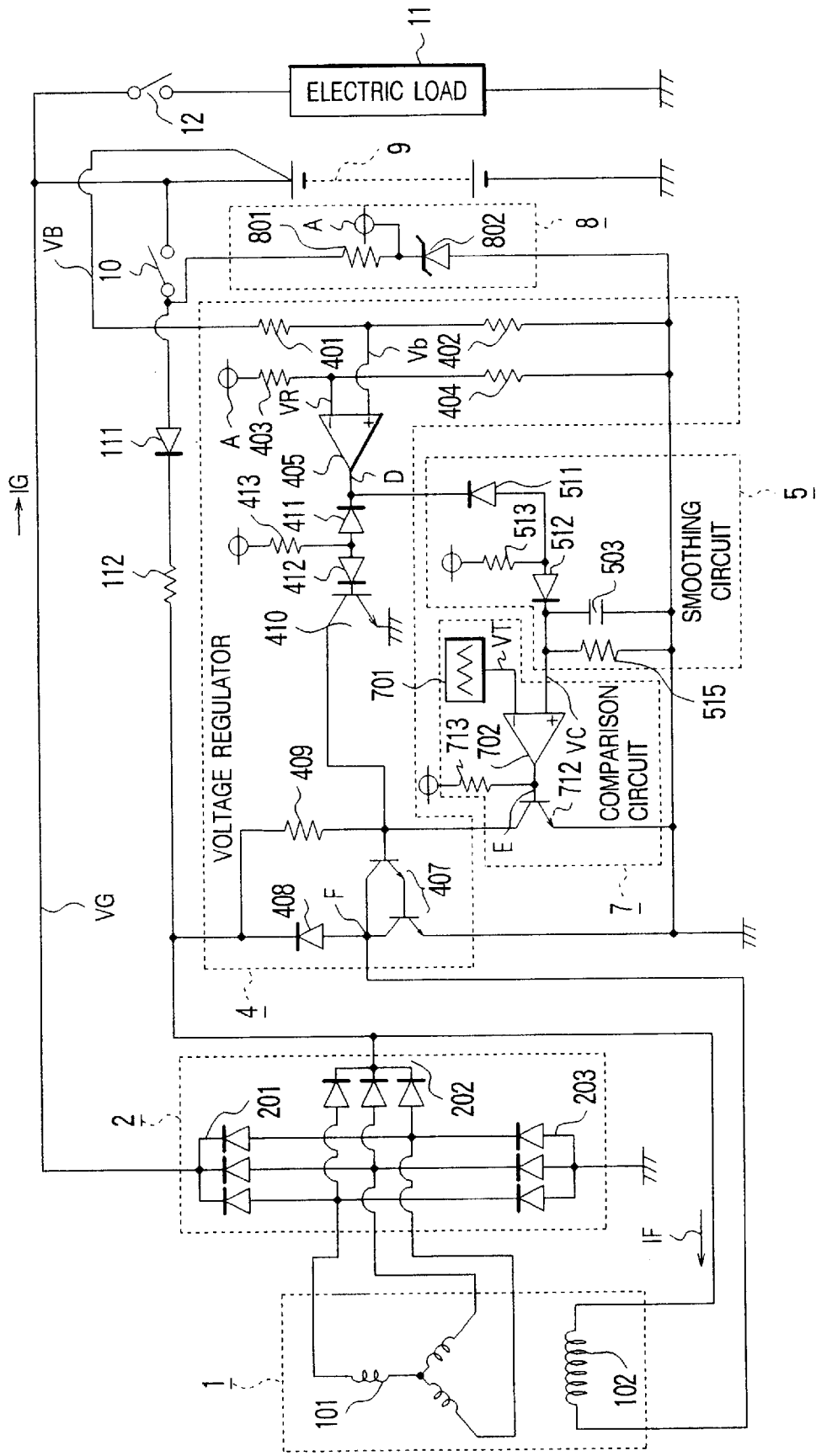
FIG. 2 is a circuit diagram showing a conventional vehicle generator controller.

Note, the circuit arrangement of the embodiment 1 of the present invention is similar to that shown in FIG. 2 except that the resistor 513 in a smoothing circuit 5 is set to a large value and the charging time constant to a capacitor 503 is set long of about one second or longer (for example, an optimum range is about 1–5 seconds).

Figure 1:
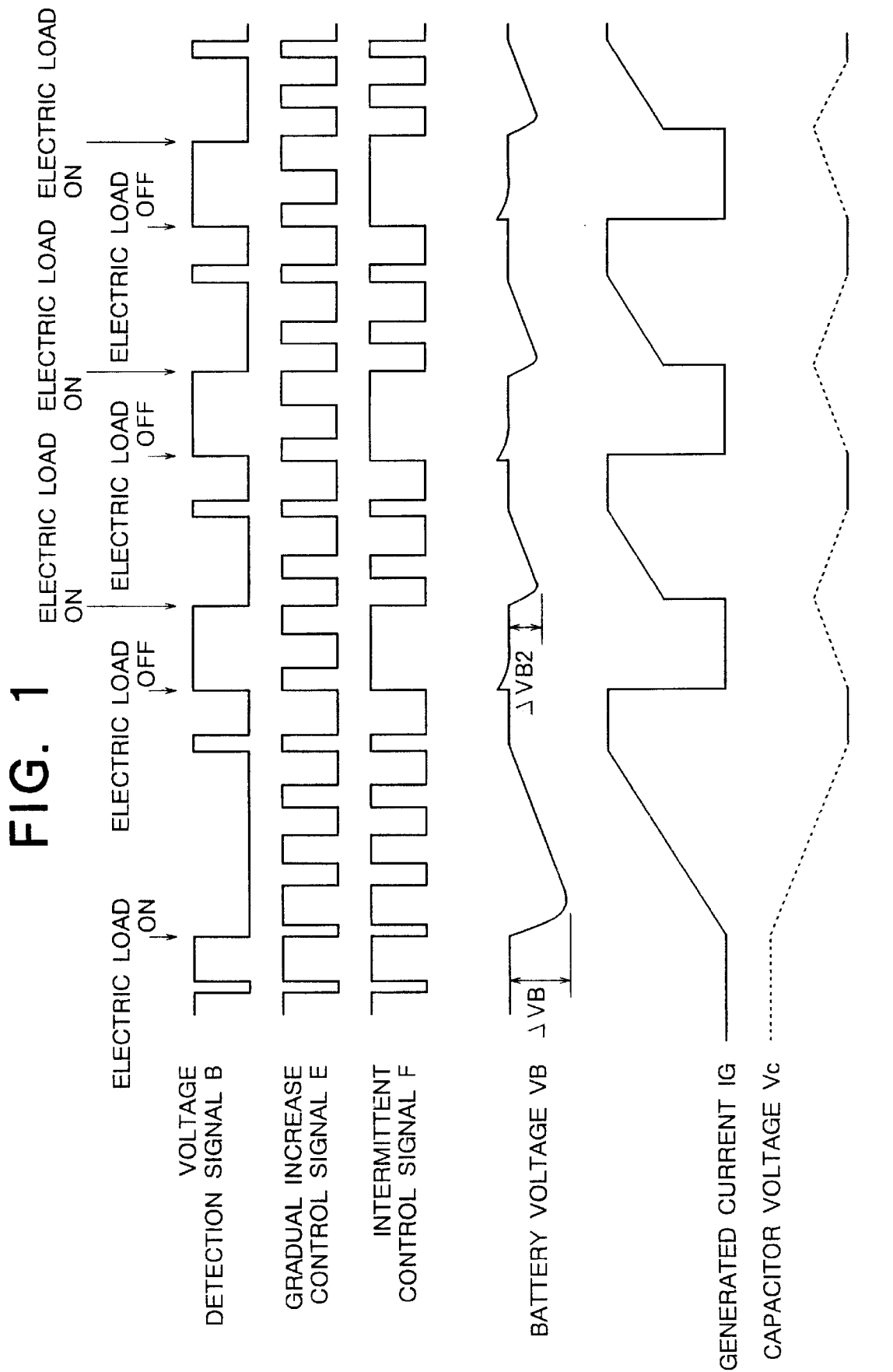
FIG. 1 is a waveform view showing operation of an embodiment 1 according to the present invention when an electric load is tuned on and off.

FIG. 1 is an operation waveform view showing the change in time of respective signals D–F, respective voltages VB, VC and a generated current IG which corresponds to the turning on and off of an electric load 11 (hazard indicator, winker and the like) which is intermittently turned on.

In FIG. 1, although the battery voltage VB drops as it does conventionally when the electric load 11 is turned on for the first time, the drop amount VB2 of the battery voltage VB is suppressed when the electric load 11 is turned on at a second time and thereafter.

In this case, since the resistance value of the resistor 513 in the smoothing circuit 5 (see FIG. 2) constituting a gradual increase control circuit is set to a large value and the charging time constant to the capacitor 503 is set long (for example, optimally to 1–5 seconds) both the charge and the discharge of the capacitor voltage VC are delayed.

Therefore, a gradual increase control signal E moves to a waveform which gradually decreases when the battery voltage VB increases (when the electric load 11 is turned off) and the gradual increase control signal E output from a comparator 702 requires a time of one second or more to return to the waveform before the electric load 11 is turned on (optimally, 5 seconds or shorter).

Accordingly, when the electric load 11 is turned on again just after it is turned off, since the duty in the low level section of the gradual increase control signal E is maintained to a large value, the generated current IG is not instantly made to a gradually increasing state but it is temporarily increased abruptly and then gradually increased after it reaches a value corresponding to the duty of the gradual increase control signal E.

Since the drop amount VB2 of the battery voltage VB can be suppressed by compensating the insufficient charge of the a battery 9 by sufficiently securing the generated current when the electric load 11 is turned on again (when it is repeatedly turned on) as described above, no uncomfortable feeling is applied to the driver.

After the generated current IG is increased, a torque shock can be suppressed by the gradually increasing control of a field current IF likewise the conventional control.

Further, since the time constant circuit in the smoothing circuit 5 is composed of an ordinary CR circuit including the resistor 513, a resistor 515 and the capacitor 503, cost is not particularly increased.

Embodiment 2

Note, although the time constant circuit in the smoothing circuit 5 is composed of the ordinary CR circuit including the resistors 513, 515 and the capacitor 503 in the embodiment 1, it may be composed of a constant current circuit and a capacitor (not shown) and cost is not increased also in this case.

Embodiment 3

Further, the embodiment 1 sets the charging time constant in the smoothing circuit 5 longer than that in the conventional circuit to determine the duty waveform of the gradual increase control signal E. In a circuit having a different phase, however, since the gradual increase control signal E is gradually increased by the charging time constant when the electric load 11 is turned on, whereas when the electric load 11 is turned off, the signal E is returned, by the discharging time constant, to the duty waveform before the electric load 11 is turned on, the discharging time constant in the smoothing circuit 5 must be set long (optimally, within 5 seconds).

In any case, however, it suffices only to set the circuit constant in the smoothing circuit 5 so as to make both the charging time constant and the discharging time constant long.

What is claimed is:

1. A vehicle generator controller for regulating a voltage output from a generator for charging a battery mounted on a vehicle in accordance with a battery voltage, comprising:

a voltage detection circuit for outputting a voltage detection signal by comparing the battery voltage with a reference voltage;

a gradual increase control circuit for outputting a gradual increase control signal in response to the voltage detection signal; and a switching element for intermittently controlling the field current of the generator in response to the gradual increase control signal; wherein said gradual increase control circuit includes:

a smoothing circuit for smoothing the voltage detection signal;

a triangle generator for creating a triangle voltage; and a comparator for outputting a gradual increase control signal by comparing the signal output from said smoothing circuit with the triangle voltage; wherein said smoothing circuit includes a time constant circuit for setting a charging time constant and a discharging time constant to the voltage detection signal; wherein the charging time constant and the discharging time constant are set such that said comparator gradually increases the field current by intermittently operating said switching element when the battery voltage drops;

the conducting ratio of said switching element is gradually increased in response to the gradual increase control signal when the battery voltage drops as well as instantly decreased regardless of the gradual increase control signal when the battery voltage increases; and both the charging time constant and the discharging time constant of said smoothing circuit are set to one second or longer to permit the gradual increase control signal to gradually decrease when the battery voltage increases as well as to gradually increase from a level in the midway of the gradual decrease when the battery voltage drops in the midway of the decrease as well as to permit the conducting ratio of said switching element to gradually increase from the conducting ratio which is in response to the gradual increase control signal in the midway of the gradual decrease when the battery voltage drops.

2. A vehicle generator controller according to claim 1, wherein said time constant circuit is composed of a capacitor-resistor circuit including resistors and a capacitor.

3. A vehicle generator controller according to claim 1, wherein said time constant circuit is composed of a constant current circuit and a capacitor.

* * * * *